(12) United States Patent
Okino (10) Patent No.: US 12,093,225 B2
(45) Date of Patent: Sep. 17, 2024

(54) INFORMATION PROCESSING DEVICE

(71) Applicant: Sony Interactive Entertainment Inc., Tokyo (JP)

(72) Inventor: Naoto Okino, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 319 days.

(21) Appl. No.: 17/609,812

(22) PCT Filed: May 25, 2020

(86) PCT No.: PCT/JP2020/020468
§ 371 (c)(1),
(2) Date: Nov. 9, 2021

(87) PCT Pub. No.: WO2020/241545
PCT Pub. Date: Dec. 3, 2020

(65) Prior Publication Data
US 2022/0226735 A1 Jul. 21, 2022

(30) Foreign Application Priority Data
May 31, 2019 (JP) .................... 2019-102121

(51) Int. Cl.
*G06F 16/18* (2019.01)
*G06F 16/13* (2019.01)
(52) U.S. Cl.
CPC ........ *G06F 16/1847* (2019.01); *G06F 16/137* (2019.01)
(58) Field of Classification Search
CPC ............. G06F 16/1847; G06F 16/137
See application file for complete search history.

(56) References Cited

U.S. PATENT DOCUMENTS 6,684,226 B1 * 1/2004 Bodilsen ............... G06F 16/10
707/999.203
7,962,531 B2 * 6/2011 Hitz ...................... G06F 16/10
707/822
(Continued)

FOREIGN PATENT DOCUMENTS

JP 2013222373 A 10/2013
JP 2015088143 A 5/2015
(Continued)

OTHER PUBLICATIONS

Notice of Reasons for Refusal for corresponding JP Application No. 2019-102121, 10 pages, dated Sep. 13, 2022.
(Continued)

*Primary Examiner* — Hosain T Alam
*Assistant Examiner* — Robert F May
(74) *Attorney, Agent, or Firm* — Matthew B. Dernier, Esq.

(57) ABSTRACT

A block processing section divides a file generated by an application into a plurality of data blocks and stored the data blocks in an auxiliary storage device. A metadata processing section stores, in the auxiliary storage device, first metadata including a hash value and information for identifying a storage location of each of the plurality of data blocks. When the file is updated, the block processing section stores an updated data block in another storage location. The metadata processing section stores, in the auxiliary storage device, second metadata including a hash value and information for identifying a storage location of each of a plurality of data blocks including the updated data block. A metadata switching section sets the second metadata to be used for file access.

10 Claims, 6 Drawing Sheets

(56) References Cited

U.S. PATENT DOCUMENTS

| | | | |
|---|---|---|---|
| 9,286,059 B2 | 3/2016 | Hatakeyama | |
| 10,061,520 B1* | 8/2018 | Zhao | G06F 3/0611 |
| 10,166,467 B2 | 1/2019 | Okino | |
| 10,261,944 B1* | 4/2019 | Armangau | G06F 16/162 |
| 2007/0094310 A1* | 4/2007 | Passey | G06F 11/2094 |
| 2010/0057755 A1* | 3/2010 | Schneider | G06F 16/10 |
| | | | 711/E12.078 |
| 2012/0109983 A1* | 5/2012 | Vanderhallen | G06F 16/14 |
| | | | 707/E17.058 |
| 2013/0282952 A1 | 10/2013 | Miyamae | |
| 2014/0006465 A1* | 1/2014 | Davis | G06F 16/1752 |
| | | | 707/827 |
| 2014/0074808 A1* | 3/2014 | Barrall | G06F 12/0246 |
| | | | 707/695 |
| 2015/0126283 A1* | 5/2015 | Okino | A63F 13/71 |
| | | | 463/42 |
| 2015/0126284 A1 | 5/2015 | Okino | |
| 2015/0301823 A1 | 10/2015 | Hatakeyama | |
| 2018/0285375 A1* | 10/2018 | Desai | G06F 16/13 |

FOREIGN PATENT DOCUMENTS

| | | | | |
|---|---|---|---|---|
| JP | 2015207145 A | | 11/2015 | |
| JP | 2017027203 A | * | 2/2017 | |
| WO | WO-2016206070 A1 | * | 12/2016 | G06F 12/02 |

OTHER PUBLICATIONS

Notice of Reasons for Refusal for corresponding JP Application No. 2019-102121, 11 pages, dated Mar. 10, 2023.
International Search Report or corresponding PCT Application No. PCT/JP2020/020468, 4 pages, dated Jul. 9, 2020.

* cited by examiner

INFORMATION PROCESSING DEVICE

TECHNICAL FIELD

The present invention relates to a technique for managing files.

BACKGROUND ART

Applications of games or the like have a save function that stores various types of data indicating the current state in a storage device. When storing saved data in the storage device, a file system also stores various types of metadata regarding the storage location of a file and a hash value for a falsification check or the like in the storage device at the same time.

SUMMARY

Technical Problem

As the types of metadata increase and the data size increases, it takes some time to update the metadata. If a trouble such as a power failure occurs while the metadata is being updated, the relation between the pieces of metadata may become inconsistent and there is a possibility that the saved data is lost. Therefore, in the file system, it is desired to develop a technique for updating metadata without causing inconsistency.

Solution to Problem

In order to solve the above problem, the information processing device of one aspect of the present invention is provided with a block processing section that divides a file generated by an application into a plurality of data blocks and stores the plurality of data blocks in a storage device, a metadata processing section that stores first metadata in the storage device, the first metadata including a hash value and information for identifying a storage location of each of the plurality of data blocks, and a metadata switching section that sets the first metadata to be used for file access. When the file is updated, the block processing section stores a data block having been updated in another storage location. The metadata processing section stores second metadata in the storage device, the second metadata including a hash value and information for identifying a storage location of each of a plurality of data blocks including the updated data block. The metadata switching section sets the second metadata to be used for file access.

It should be noted that any combination of the above components and the conversion of the expression of the present invention between methods, devices, systems, recording media, computer programs, and the like are also effective as aspects of the present invention.

DESCRIPTION OF EMBODIMENT

Figure 1:
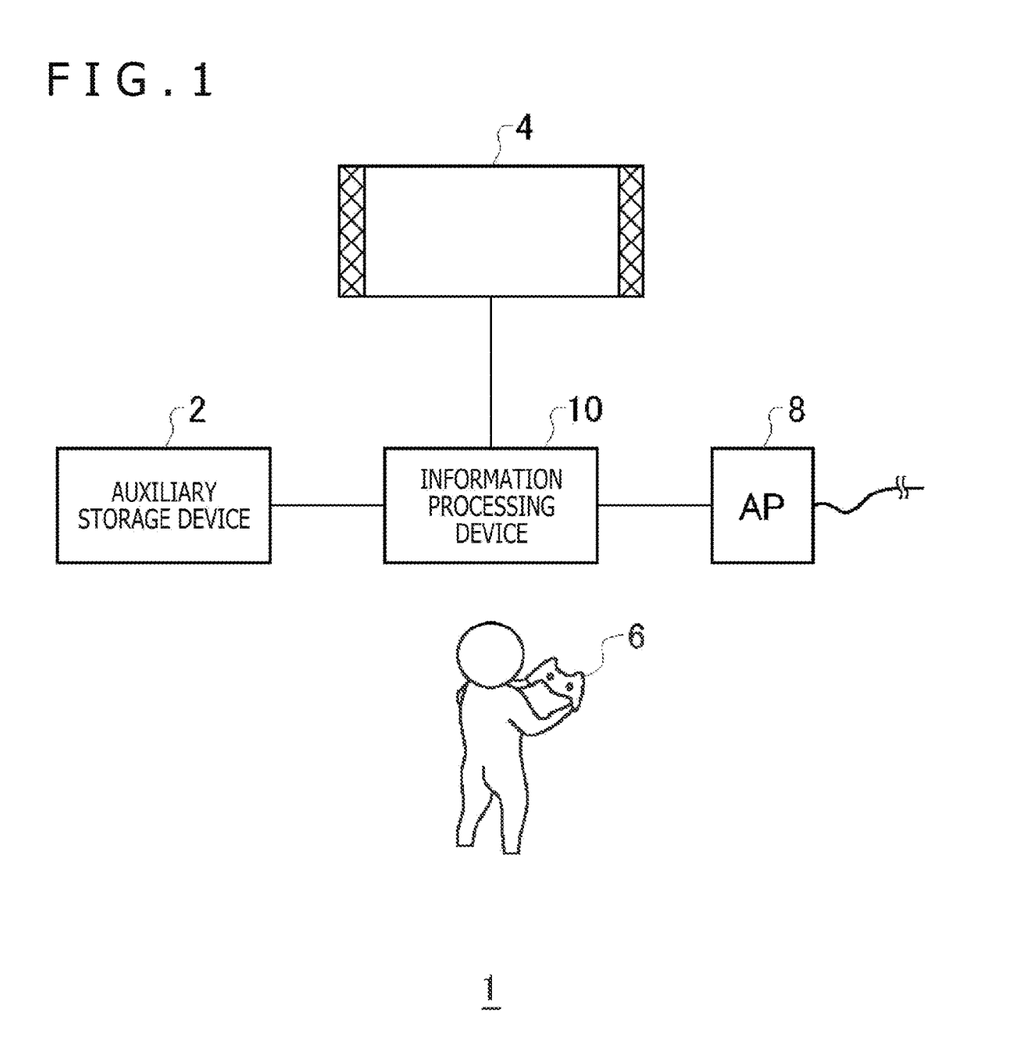
FIG. 1 is a diagram illustrating an information processing system according to an embodiment of the present invention.

FIG. 1 illustrates an information processing system 1 according to an embodiment of the present invention.

An information processing device 10 is wirelessly or wiredly connected to an input device 6 operated by a user, and the input device 6 outputs operation information indicating an operation result of the user to the information processing device 10. When receiving the operation information from the input device 6, the information processing device 10 reflects the operation information in the processing of an operating system (OS) (system software) or an application and causes an output device 4 to output a processing result. In the information processing system 1, the information processing device 10 may be a game device that executes a game program, and the input device 6 may be a device such as a game controller, the device supplying user operation information to the information processing device 10. The input device 6 has a plurality of input units such as a plurality of push-type operation buttons, an analog stick capable of inputting an analog amount, and a rotary button.

An auxiliary storage device 2 is a large-capacity storage device such as a solid state drive (SSD) and may be a built-in storage device or an external storage device that is connected to the information processing device 10 by a universal serial bus (USB) or the like. The output device 4 may be a television set having a display for outputting an image and a speaker for outputting audio or may be a head-mounted display.

An access point (hereinafter referred to as an "AP") 8 has the functions of a wireless access point and a router, and the information processing device 10 connects to the AP 8 wirelessly or wiredly and can be communicably connected to a server on an external network such as the Internet.

Figure 2:
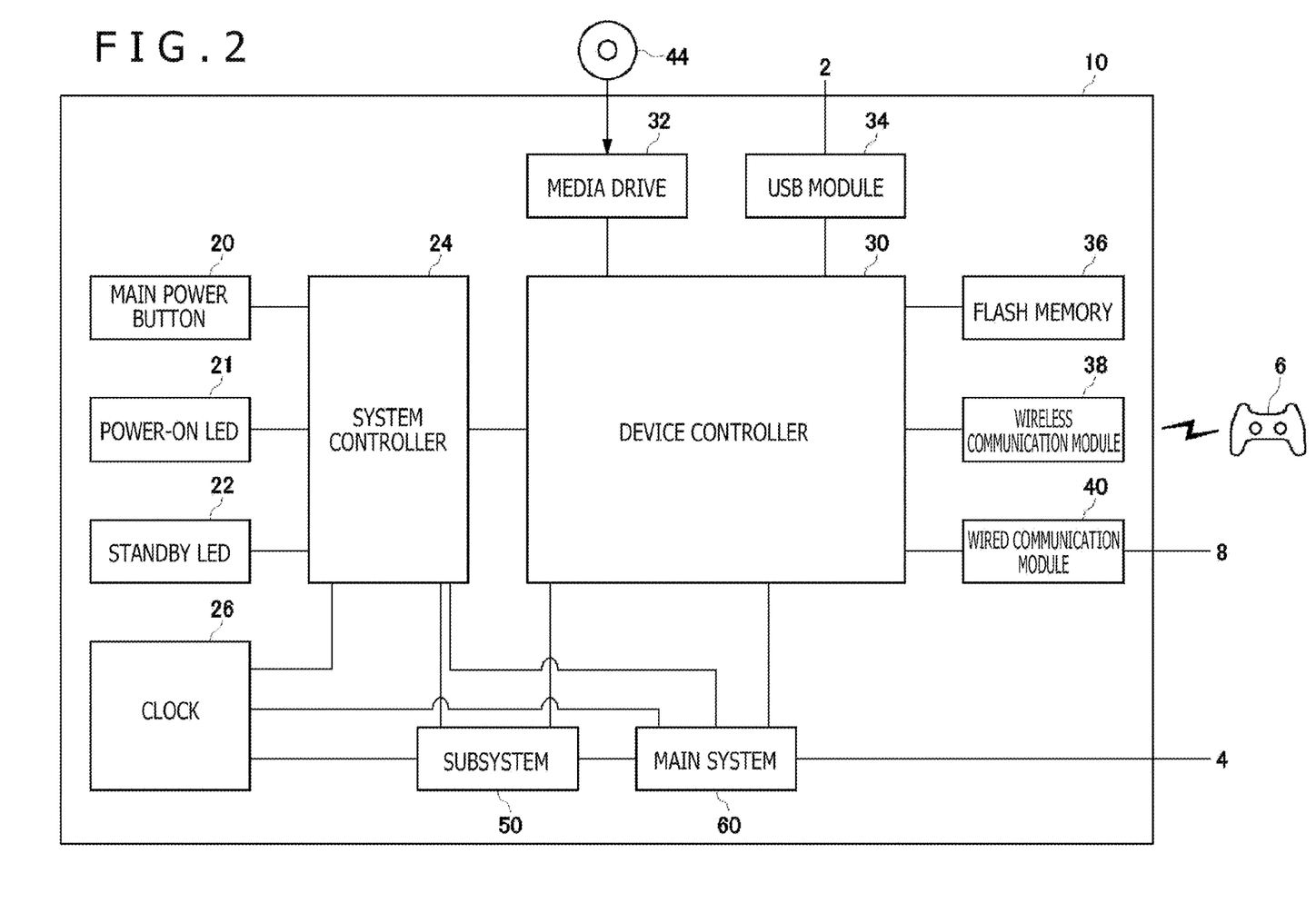
FIG. 2 is a diagram illustrating a hardware configuration of an information processing device.

FIG. 2 illustrates the hardware configuration of the information processing device 10. The information processing device 10 includes a main power button 20, a power-ON LED 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main central processing unit (CPU), a memory and a memory controller which are a main storage device, a graphics processing unit (GPU), and the like. The GPU is mainly used for arithmetic processing of a game program. These functions may be configured as system-on-chip and formed on one chip. The main CPU has a function of executing a game program recorded in the auxiliary storage device 2.

The subsystem 50 includes a sub CPU, a memory and a memory controller as a main storage device, and the like and does not have a GPU or a function of executing a game program. The number of circuit gates of the sub CPU is smaller than that of the main CPU, and operating power consumption of the sub CPU is smaller than that of the main CPU. The sub CPU operates even while the main CPU is in the standby state, and its processing function is limited in order to keep the power consumption low.

The main power button 20 is an input unit for inputting operations from the user and is provided on the front surface of the housing of the information processing device 10 to be manipulated for turning on or off power supply to the main system 60 of the information processing device 10. The power-ON LED 21 lights up when the main power button 20 is turned on, and the standby LED 22 lights up when the main power button 20 is turned off.

The system controller 24 detects that the user presses the main power button 20. When the main power button 20 is pressed while the main power is off, the system controller 24 acquires the pressing operation as an "on instruction," and, on the other hand, when the main power button 20 is pressed while the main power is on, the system controller 24 acquires the pressing operation as an "off instruction."

The clock 26 is a real-time clock that generates current date and time information and supplies the information to the system controller 24, the subsystem 50, and the main system 60. The device controller 30 is configured as a large-scale integrated circuit (LSI) that executes information transfer between devices, like a south bridge. As illustrated in the figure, devices such as the system controller 24, the media drive 32, the USB module 34, the flash memory 36, the wireless communication module 38, the wired communication module 40, the subsystem 50, and the main system 60 are connected to the device controller 30. The device controller 30 absorbs the difference in electrical characteristics and the difference in data transfer speed of respective devices and controls the timing of data transfer.

The media drive 32 is a drive device that drives a read only memory (ROM) medium 44 in which software and license information of a game, or the like is recorded, after attachment thereof, so as to read a program, data, or the like therefrom. The ROM medium 44 is a read-only recording medium such as an optical disk, a magneto-optical disk, or a Blu-ray disk.

The USB module 34 is a module that connects to an external device via a USB cable. The USB module 34 may be connected to the auxiliary storage device 2 via a USB cable. The flash memory 36 is an auxiliary storage device that constitutes an internal storage. The wireless communication module 38 uses a communication protocol such as a Bluetooth (registered trademark) protocol or an IEEE 802.11 protocol to wirelessly communicate with the input device 6, for example. Note that the wireless communication module 38 may be compatible with the digital mobile phone system. The wired communication module 40 communicates with an external device by wire and connects to an external network via the AP 8, for example.

Figure 3:
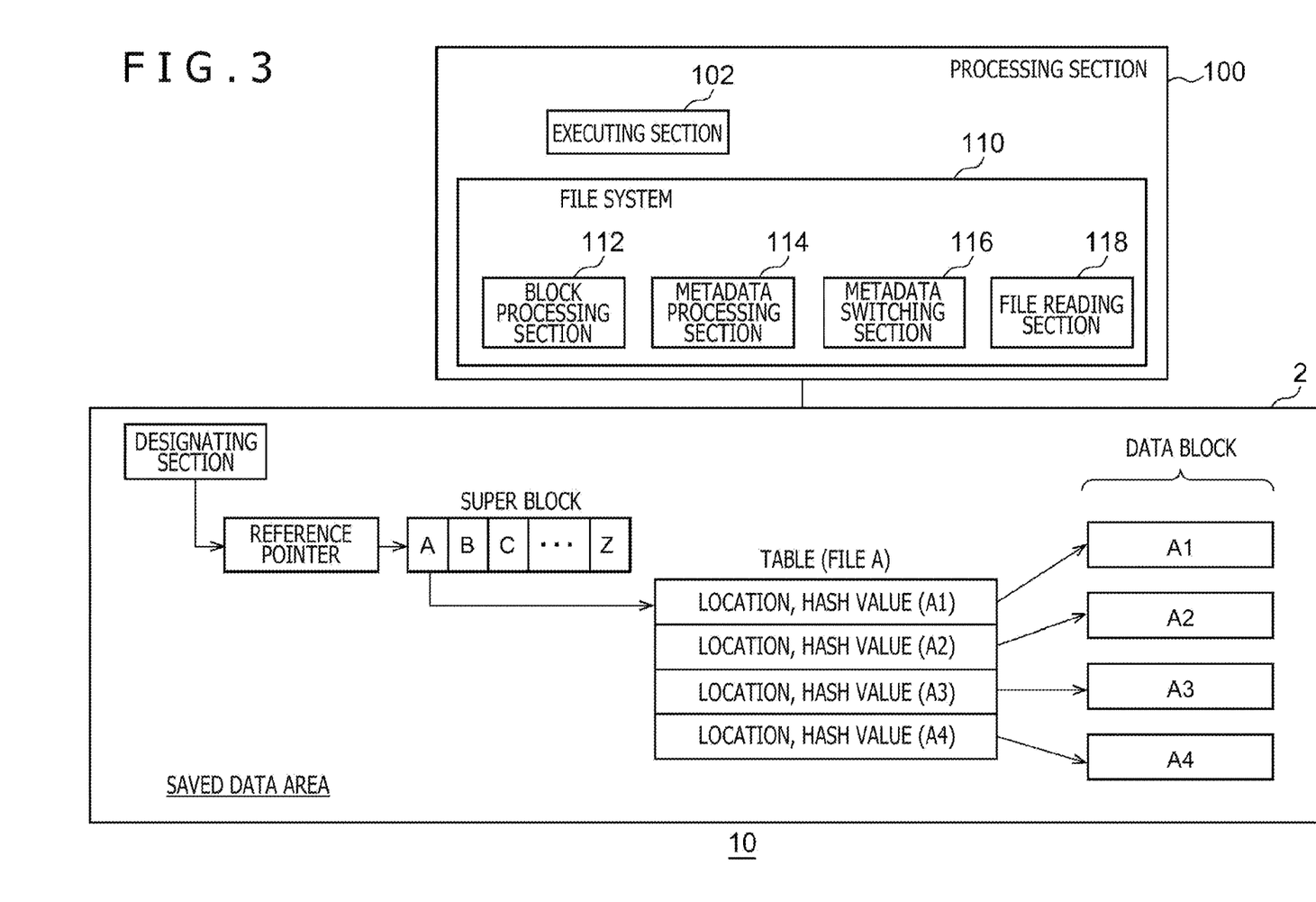
FIG. 3 is a diagram illustrating a functional block for achieving a metadata update function.

FIG. 3 illustrates a functional block for achieving the metadata update function of the information processing device 10. A processing section 100 is configured in the main system 60 and includes an executing section 102 and a file system 110. The file system 110 includes a block processing section 112, a metadata processing section 114, a metadata switching section 116, and a file reading section 118.

The configuration of the processing section 100 is achieved by a CPU, a memory, programs loaded in the memory, a storage, and the like of any computer, as hardware components, but here, the functional blocks achieved by their cooperation are drawn. Therefore, it will be understood by those skilled in the art that these functional blocks can be attained in various ways by hardware only, software only, or a combination thereof.

The executing section 102 executes the game program and outputs a game image and game sound from the output device 4. When instructions to store saved data is supplied from the game program to the file system 110 during the execution of the game program, the file system 110 stores the saved data in the auxiliary storage device 2.

The block processing section 112 divides the saved data file generated by the game program into a plurality of data blocks and stores the data blocks in the auxiliary storage device 2. The game program of the embodiment generates a plurality of saved data files A to Z. A process in which the file system 110 stores and updates the file A supplied from the game program will hereinafter be described.

The block processing section 112 divides the file A into a plurality of data blocks A1, A2, A3, and A4 and stores the data blocks in the auxiliary storage device 2. A saved data area for storing saved data is secured in advance in the auxiliary storage device 2, and the block processing section 112 allocates a vacant storage location to each data block and stores each data block.

The metadata processing section 114 has a function of calculating the hash value of the data block and calculates the hash value of each data block. The metadata processing section 114 stores, in the saved data area, metadata including a hash value and information (location information) for identifying the storage location of each of the plurality of data blocks. The metadata processing section 114 may manage the location information for each data block and the hash value in a form of a table (file A). The location information may be any information that can be used to identify the storage location of the data block. The location information is typically a page number that specifies the relative position of the page in an SSD and may be information regarding the data size or the block offset for calculating the page number.

The metadata processing section 114 stores, in the saved data area, the metadata including the location information and the hash value of the table for the file A. This metadata may be managed in the form of a super block. Note that, although FIG. 3 illustrates the table for file A and the data blocks A1 to A4 of the file A, the tables and data blocks for the other files B to Z are also stored in the saved data area similarly. Therefore, the super block includes information for accessing all the files A to Z.

The metadata processing section 114 stores, in the saved data area, the metadata including the location information for the super block and the hash value. This metadata is a reference pointer for accessing the super block, and when the file system 110 accesses the reference pointer, all the files A to Z can be accessed via the super block.

The metadata switching section 116 sets the metadata used for file access. The metadata switching section 116 sets the metadata including the super block and the table (file A) as the metadata used for file access, by selecting the reference pointer. When the file system 110 receives an instruction to read the saved data from the game program in this state, the file reading section 118 refers to the reference pointer selected by the metadata switching section 116 and reads out the saved data which the instruction designates.

Next, a process in which the file A is updated to the file A' by the game program and the file A' after the update is stored in the saved data area will be described. The block processing section 112 divides the file A' into a plurality of data blocks A1, A2', A3, and A4. In this case, when the file A' after the update is compared with the file A before the update, the data block A2 has been changed into the data block A2', and the other data blocks A1, A3, and A4 are not updated. Therefore, the block processing section 112 stores the data block A2' after the update in another vacant storage location.

Figure 4:
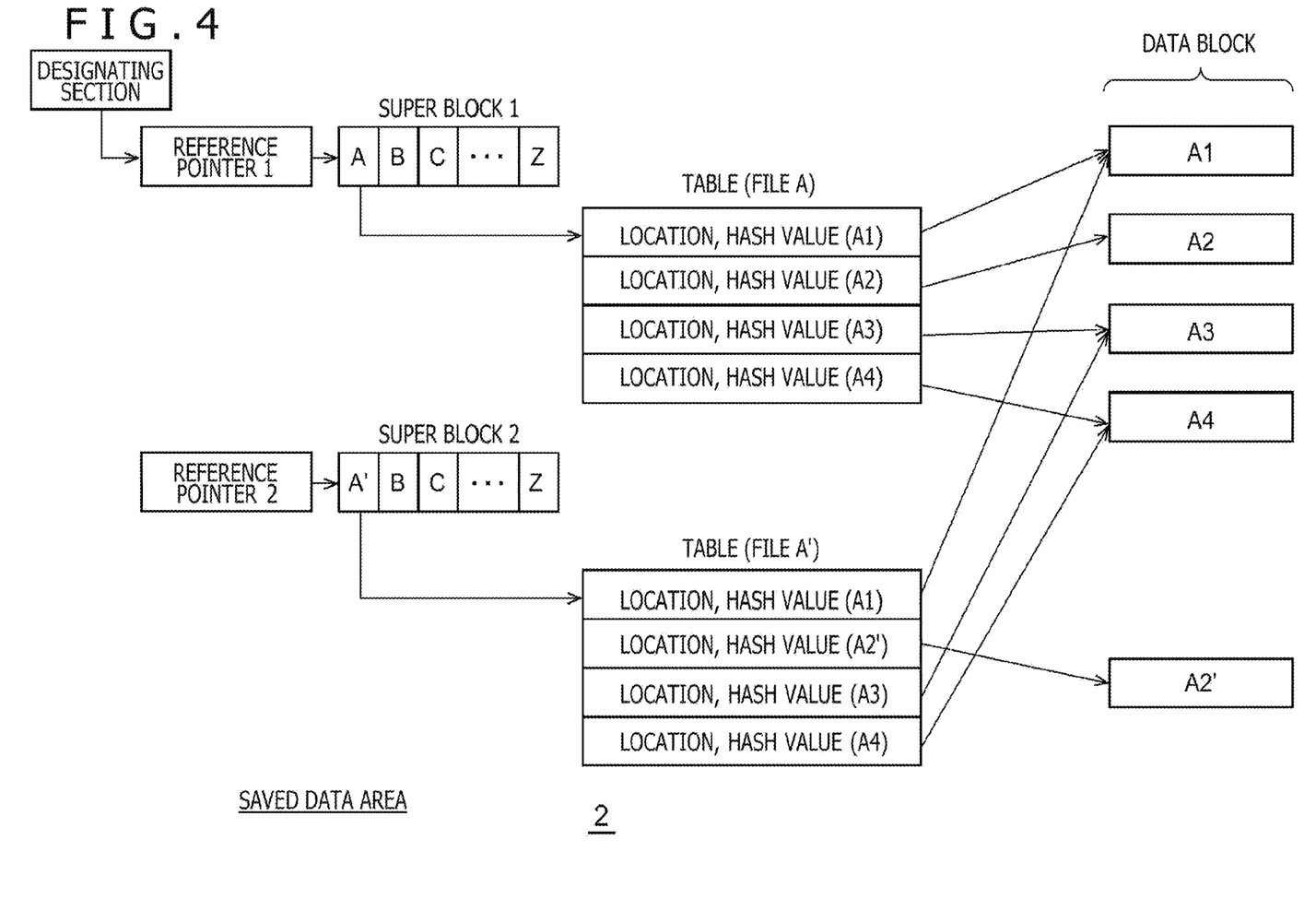
FIG. 4 is a diagram schematically illustrating a storage state of a saved data area.

FIG. 4 schematically illustrates the storage state of the saved data area when the file A is updated to the file A'. With reference to FIG. 3, the "super block 1" and "reference pointer 1" in FIG. 4 represent the "super block" and "reference pointer" illustrated in FIG. 3.

First, the block processing section 112 stores the data block A2' after the update in a vacant storage location. Incidentally, since the data blocks A1, A3, and A4 have not been updated, the block processing section 112 does not write the data blocks A1, A3, and A4 into a vacant storage location.

The metadata processing section 114 stores, in the saved data area of the storage device, the metadata including the hash value and the information (location information) for identifying the storage location of each of the plurality of data blocks including the data block A2' after the update. In FIG. 4, the metadata processing section 114 stores the location information for each of the data blocks and the hash value in the saved data area as a table (file A'). As illustrated in the figure, the table (file A') includes metadata including hash values and information for identifying the storage location of the data block A2' after the update and a storage location of the data blocks A1, A3, and A4 that have already been stored in the saved data area and have not been updated.

The metadata processing section 114 stores, in the saved data area, the metadata including the location information and the hash value of the table for the file A'. This metadata may be managed in the form of a super block. The metadata processing section 114 stores the metadata including the location information and the hash value of the table for the files A' and the files B to Z in the saved data area as "super block 2."

The metadata processing section 114 stores, in the saved data area, the metadata including the location information regarding the super block 2 and the hash value. This metadata is a reference pointer 2 for accessing the super block 2, and when the file system 110 accesses the reference pointer 2, the files A', B to Z can be accessed via the super block 2.

In the conventional file update process, file management is performed as follows. When the data block A2' is written, the data block A2 is deleted at the same time, and when the metadata related to the file A' is written, the metadata related to the file A is deleted at the same time. Therefore, if the system goes down due to a power failure or the like while a plurality of types of metadata are being written, metadata that has been updated and metadata that has not been updated will be mixed up together, and a situation where the metadata is not consistent after the system is restored can happen. In this case, the file system cannot access the newly written saved data or the previously written saved data, and as a result, the saved data is lost.

According to the file system 110 of the embodiment, when the updated data block and the corresponding metadata are written, neither the already stored data block nor metadata is deleted. Therefore, even in a case where a trouble such as a power failure occurs while the updated data block and metadata are being written, the situation where the saved data is completely lost can be avoided because at least the consistent stored data block and metadata remain in the saved data area.

When the writing of the updated data block and the corresponding metadata is completed, the metadata switching section 116 sets the metadata to be used for file access as the metadata including the super block 2 and the table (file A').

Figure 5:
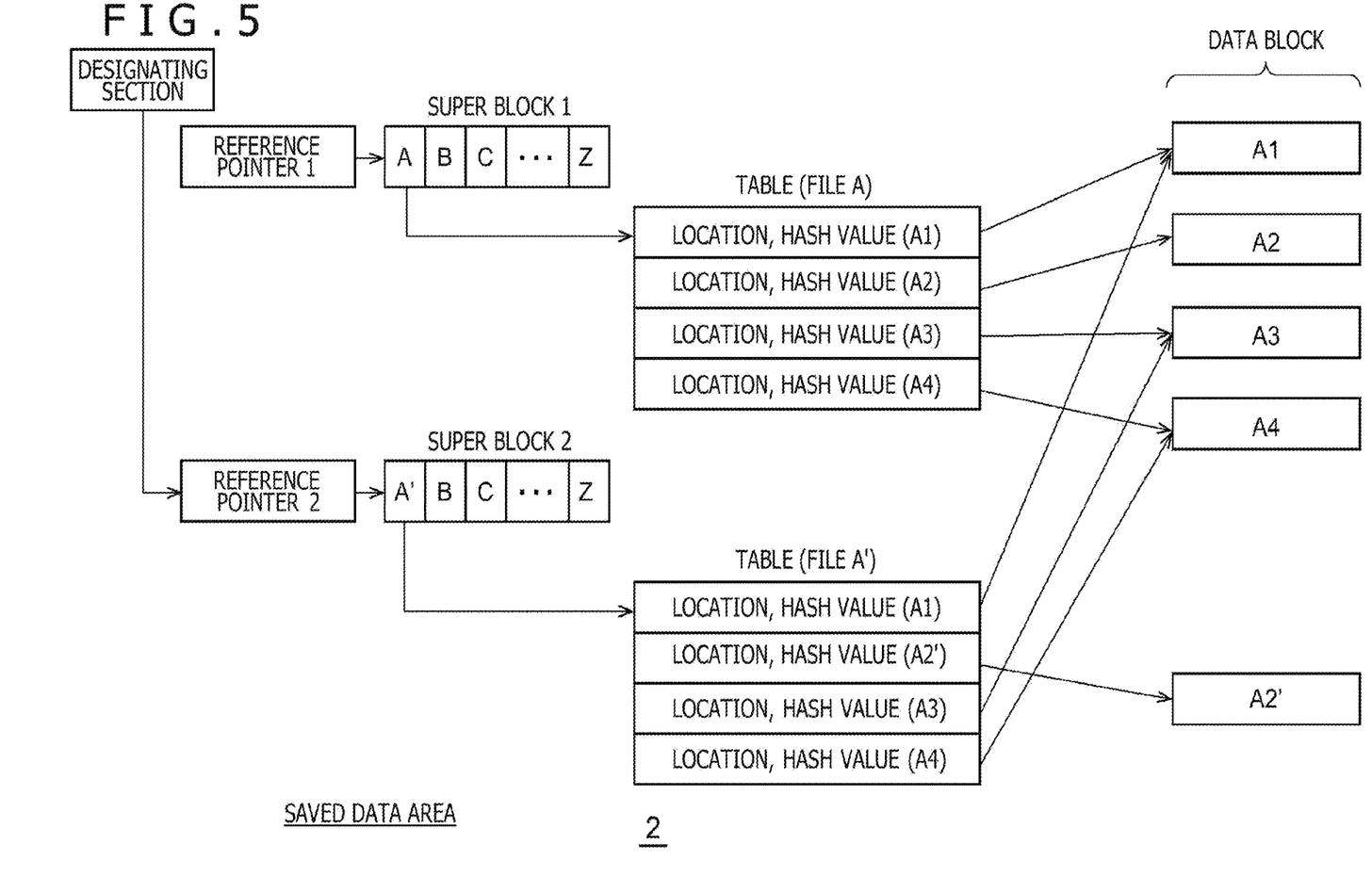
FIG. 5 is a diagram illustrating a state in which metadata has been changed.

FIG. 5 illustrates a state in which the metadata to be used for file access has been changed to the metadata including the super block 2 and the table (file A'). By selecting the reference pointer 2, the metadata switching section 116 sets the metadata including the super block 2 and the table (file A') as the metadata to be used for file access. When the file system 110 receives an instruction to read the saved data from the game program in this state, the file reading section 118 refers to the reference pointer 2 selected by the metadata switching section 116 and reads the saved data which the instruction designates.

After the metadata switching section 116 sets the metadata including the super block 2 and the table (file A') to be used for file access, the block processing section 112 deletes the data block A2 before the update from the saved data area, and the metadata processing section 114 deletes the metadata before the update from the saved data area.

Figure 6:
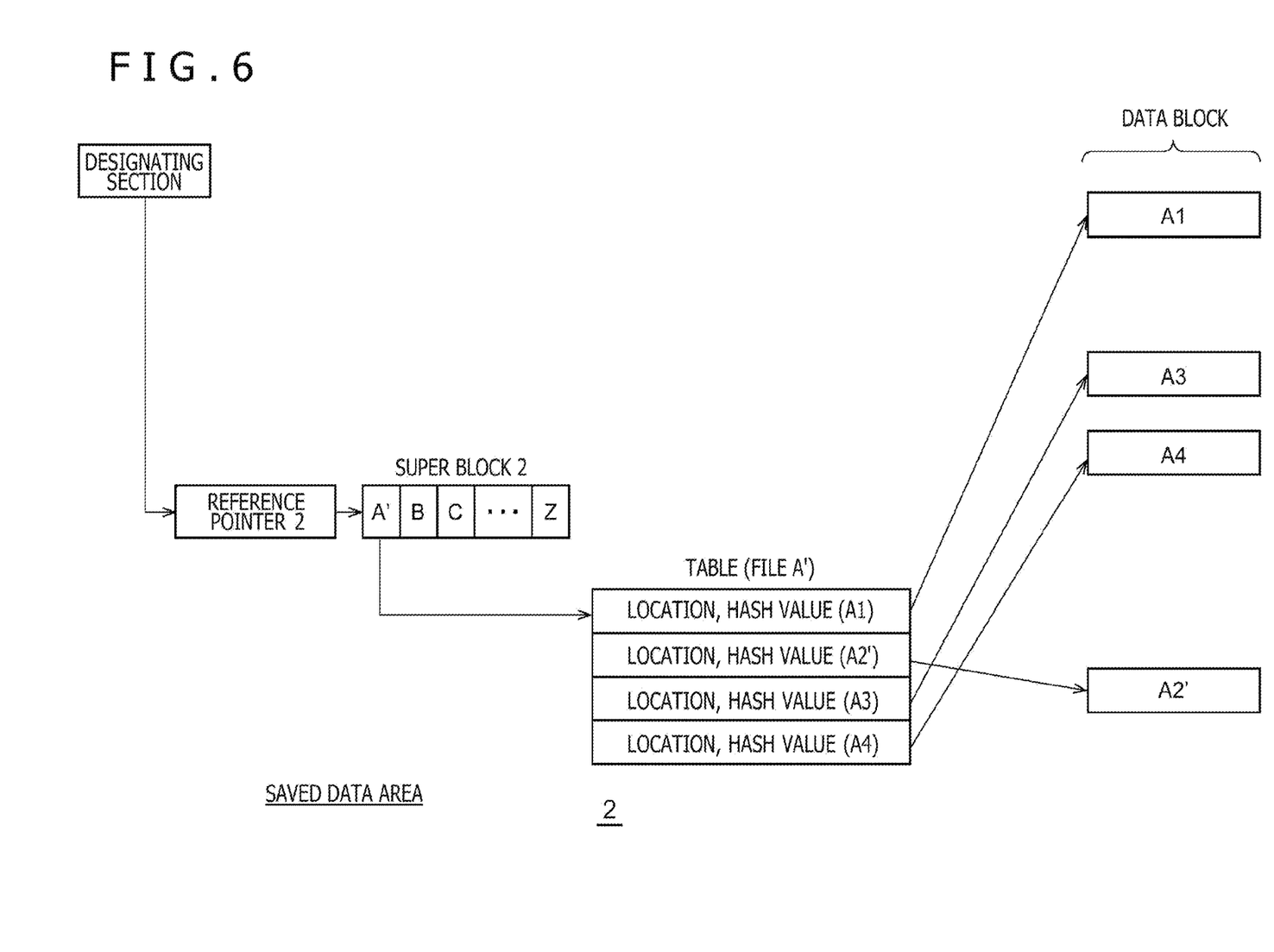
FIG. 6 is a diagram illustrating a state in which data blocks and metadata before update have been deleted.

FIG. 6 illustrates a state in which the data block and the metadata before the update have been deleted. By deleting the data block and metadata before the update after the metadata switching section 116 switches the reference pointers, the possibility that the saved data will be lost when the system unexpectedly goes down can be reduced. Incidentally, in a case where the auxiliary storage device 2 is an SSD, data deleting is performed in units of blocks in which a plurality of pages are gathered, so that data blocks, tables, and the like may be set in units of blocks in the SSD.

Although the update process of the file A has been described above, a plurality of files may be linked in the saved data. For example, it is assumed that the file B is the data indicating a game stage at the time of saving, and the file C is the data indicating information of the weapon possessed by the player character at the time of saving. In a game with a scenario in which a special weapon can be obtained for each stage, inconsistency must not happen between information regarding the game stage and information regarding the possessed weapons in the saved data. Therefore, in the update process of the saved data, it is necessary to surely update the file B and the file C at the same time, and the situation where the file B has been able to be updated but the file C has not been able to be updated needs to be avoided.

Therefore, the metadata switching section 116 preferably executes the metadata switching process when receiving a permission instruction to permit a reflection of the update from the game program. Hereinafter, a case where the files B and C are linked will be described.

The game program supplies the update instruction for the files B and C and the permission instruction to permit the reflection of the update in this order to the file system 110. The instructions from the game program are executed in the file system 110 in the order of the instructions, and the file system 110 updates the file B according to the update instruction for the file B, updates the file C according to the update instruction for the file C, and subsequently performs commit processing according to the permission instruction, to make the updated files B and C accessible.

To be specific, when the file system 110 receives this series of instructions, the block processing section 112 stores the data block updated in the file B in a vacant storage location, and the metadata processing section 114 stores metadata corresponding to the updated file B in a vacant storage location. Next, the block processing section 112 stores the data block updated in the file C in a vacant storage location, and the metadata processing section 114 stores the metadata corresponding to the updated file C in a vacant storage location. Then, the metadata switching section 116 sets the updated metadata to be used for file access by selecting a new reference pointer.

That is, the metadata switching section 116 executes the metadata switching process on condition that the update instruction for the files B and C issued before the permission instruction has been executed. This process is made by introducing the concept of transaction management into file update and ensures that files B and C are updated without contradiction.

It should be noted that the game program outputs a series of instructions to the file system 110, but the block processing section 112 may store the file for which update instruction is issued in a buffer memory (not illustrated) until the game program outputs the permission instruction, instead of writing the file into the auxiliary storage device 2. When the application outputs the permission instruction, the block processing section 112 starts writing the file stored in the buffer memory into the auxiliary storage device 2. In the case where the auxiliary storage device 2 is an SSD, since the SSD enables parallel writing of data, the writing time can be shortened by writing a plurality of files cached in the buffer memory into the SSD in parallel. At this time, as compared with a case where a plurality of files are written into the SSD one by one, the number of times of writing the metadata can be reduced, which is also suitable for the operating life of the SSD. Note that, if the size of the data to be cached exceeds the size of the buffer memory, the block processing section 112 needs to write beginning with the oldest file into the SSD before that.

The present invention has been described above based on the embodiment. This embodiment is an example, and it is understood by those skilled in the art that various modifications are possible for combinations of these respective components and processing processes, and that such modifications are also within the scope of the present invention. For example, the file system 110 can keep saved data of a plurality of generations by leaving old metadata without deleting when receiving a permission instruction. Further, in the embodiment, an example of a saved data file has been described, but the file type is not limited to that.

INDUSTRIAL APPLICABILITY

The present invention can be used in a technique for managing files.

1: Information processing system
2: Auxiliary storage device
10: Information processing device
100: Processing section
102: Executing section
110: File system
112: Block processing section
114: Metadata processing section
116: Metadata switching section
118: File reading section

The invention claimed is:
1. An information processing device comprising:
a block processing section that divides a file generated by an application into a plurality of data blocks having original data and stores the plurality of data blocks having original data in a storage device;
a metadata processing section that stores first metadata in the storage device, the first metadata including a hash value and information for identifying a storage location of each of the plurality of data blocks having original data; and
a metadata switching section that sets the first metadata to be used for file access,
wherein, when the file is updated, the block processing section stores in another storage location a data block having updated data,
the metadata processing section stores second metadata in the storage device, the second metadata including a hash value and information for identifying the storage location of the data block having updated data, and
the metadata switching section sets the second metadata to be used for file access; wherein
the metadata switching section maintains access to the data blocks having original data without losing access to the data block having updated data, and to the data block having updated data without losing access to the data blocks having original data, by:
switching from, using a first reference pointer, setting and using the first metadata for file access, to, using a second reference pointer, setting and using the second metadata for file access, and
switching from, using the second reference pointer, setting and using the second metadata for file access, to, using the first reference pointer, setting and using the first metadata for file access.

2. The information processing device according to claim 1, wherein the metadata processing section stores second metadata in the storage device, the second metadata including the hash value and information for identifying a storage location of the updated data block and a storage location of a data block that has already been stored and has not been updated.

3. The information processing device according to claim 1, wherein, after the metadata switching section sets the second metadata to be used for file access, the block processing section deletes a data block before the update from the storage device, and the metadata processing section deletes the first metadata from the storage device.

4. The information processing device according to claim 1, wherein, when the application outputs an update instruction for the file and a permission instruction that permits a reflection of the update in this order, the metadata switching section performs a metadata switching process on condition that the update instruction before the permission instruction has been executed.

5. The information processing device according to claim 4, wherein,
until the application outputs the permission instruction, the block processing section stores the file for which the update instruction is issued in a buffer memory, and,
when the application outputs the permission instruction, the block processing section starts writing the file stored in the buffer memory into the storage device.

6. The information processing device according to claim 1, wherein the storage device is an SSD.

7. The information processing device according to claim 1, wherein the file is saved data of a game.

8. A non-transitory, computer readable storage medium containing a computer program, which when executed by a computer, causes the computer to perform a method, comprising:
dividing a file generated by an application into a plurality of data blocks having original data and storing the plurality of data blocks having original data in a storage device;
storing first metadata in the storage device, the first metadata including a hash value and information for identifying a storage location of each of the plurality of data blocks having original data;

when the file is updated, storing in another storage location a data block having updated data;

storing second metadata in the storage device, the second metadata including a hash value and information for identifying the storage location of the data block having updated data; and setting the second metadata to be used for file access, wherein the setting includes maintaining access to the data blocks having original data without losing access to the data block having updated data, and to the data block having updated data without losing access to the data blocks having original data, by:

switching from, using a first reference pointer, setting and using the first metadata for file access, to, using a second reference pointer, setting and using the second metadata for file access, and switching from, using the second reference pointer, setting and using the second metadata for file access, to, using the first reference pointer, setting and using the first metadata for file access.

9. The information processing device according to claim 1, wherein the metadata processing section stores, in the storage device, a first super block that manages the first metadata and a second super block that manages the second metadata.

10. The information processing device according to claim 9, wherein a first reference pointer for accessing the first super block and a second reference pointer for accessing the second super block are stored in the storage device, and the metadata switching section sets the second super block and the second metadata to be used for file access by selecting the second reference pointer.

* * * * *